United States Patent
Naim et al.

(10) Patent No.: US 9,107,200 B1
(45) Date of Patent: Aug. 11, 2015

(54) METHODS AND SYSTEMS FOR SELECTING FREQUENCY BANDS FOR A RADIO CONNECTION

(71) Applicant: Sprint Spectrum L.P., Overland Park, KS (US)

(72) Inventors: Muhammad Naim, Sterling, VA (US); Yu Zhou, Herndon, VA (US); Shahzada Rasool, Vienna, VA (US); Anuja Chaand, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 121 days.

(21) Appl. No.: 13/964,929

(22) Filed: Aug. 12, 2013

(51) Int. Cl.
*H04W 72/00* (2009.01)
*H04W 72/04* (2009.01)

(52) U.S. Cl.
CPC ..................................... *H04W 72/04* (2013.01)

(58) Field of Classification Search
USPC ................... 455/450, 452.1–452.2, 418, 509; 370/328
See application file for complete search history.

(56) References Cited

U.S. PATENT DOCUMENTS

| 7,302,265 | B1 | 11/2007 | Chalishazar et al. |
| 7,304,979 | B2 | 12/2007 | An et al. |
| 7,313,109 | B2 | 12/2007 | Johnson et al. |
| 7,437,165 | B2 | 10/2008 | Burgess et al. |
| 7,933,229 | B2 | 4/2011 | Johnson et al. |
| 8,509,792 | B1 | 8/2013 | Oroskar et al. |
| 2004/0180661 | A1 | 9/2004 | Chen et al. |
| 2006/0063533 | A1* | 3/2006 | Matoba et al. ............ 455/452.2 |
| 2006/0094437 | A1 | 5/2006 | Sinnarajah et al. |
| 2006/0281466 | A1 | 12/2006 | Gholmieh et al. |
| 2007/0076663 | A1 | 4/2007 | Qi et al. |
| 2008/0013654 | A1 | 1/2008 | Rick et al. |
| 2009/0186627 | A1 | 7/2009 | Zhang |
| 2011/0044222 | A1 | 2/2011 | Gerstenberger et al. |
| 2011/0070874 | A1* | 3/2011 | Dominguez Romero et al. ............................ 455/418 |
| 2011/0081940 | A1 | 4/2011 | Gerstenberger et al. |
| 2012/0009966 | A1* | 1/2012 | Khanka et al. ................ 455/509 |
| 2013/0273924 | A1* | 10/2013 | Hakola et al. ................. 455/450 |

OTHER PUBLICATIONS

European Telecommunications Standards Institute, "LTE; Evolved Universal Terrestrial Radio Access (E-UTRA); User Equipment (UE) radio transmission and reception," ETSI TS 136 101, version 11.5.0, Jul. 2013, pp. 1-288.

* cited by examiner

*Primary Examiner* — Nathan Taylor (57) ABSTRACT

A base station of a radio access network (RAN) and a multi-band mobile station are configured for wireless communication in a plurality of frequency bands. The RAN selects a configuration of uplink and downlink frequencies for a radio connection between the base station and multiband mobile station. The uplink and downlink frequencies in the selected configuration are in different frequency bands. The RAN may select a frequency band for the uplink frequency based, at least in part, on a distance between the multiband mobile station and the base station. That RAN may select a frequency band for the downlink frequency based, at least in part, on respective downlink loads at the base station for the first, second, and third frequency bands.

17 Claims, 5 Drawing Sheets

METHODS AND SYSTEMS FOR SELECTING FREQUENCY BANDS FOR A RADIO CONNECTION

BACKGROUND

A radio connection between a mobile station and a base station may use, for example, frequency division duplexing (FDD) or time division duplexing (TDD). When FDD is used, the uplink (communications from the mobile station to the network) and the downlink (communications from the network to the mobile station) may use different frequencies. When TDD is used, the uplink and downlink may use the same frequency, but the uplink and downlink communications may occur at different times.

The frequencies used for uplink and downlink communications in FDD and TDD radio connections may conform to various standards. For example, the European Telecommunications Standards Institute (ETSI) has published technical specifications on "Evolved Universal Terrestrial Radio Access (E-UTRA); User Equipment (UE) radio transmission and reception" (E-UTRA standards), which define various frequency bands for FDD and TDD communication using Long Term Evolution (LTE) protocols. A recent version of the E-UTRA standards, ETSI TS 136 101 V11.5.0 (2013 July), is incorporated herein by reference. That version defines E-UTRA Bands 1-44, with each band including a specified range of frequencies.

In some instances, a mobile station may be configured for wireless communication in a plurality of frequency bands. In that case, the frequency band that the mobile station uses may depend on the frequency band or frequency bands supported by the base station that is currently serving the mobile station. Thus, when both the mobile station and base station are configured for wireless communication in a plurality of frequency bands, a radio connection between the mobile station and base station may be established using one of the frequency bands for both the uplink and the downlink.

OVERVIEW

In one aspect, disclosed embodiments provide a method involving a multiband mobile station and a base station of a radio access network (RAN). The multiband mobile station and the base station re configured for wireless communication in a plurality of frequency bands. The method includes establishing a radio connection between the multiband mobile station and the base station, wherein the radio connection uses a first configuration of uplink and downlink frequencies, and wherein the uplink and downlink frequencies in the first configuration are both in an initially-selected frequency band of the plurality of frequency bands. The method also involves, after the radio connection has been established, the RAN selecting a second configuration of uplink and downlink frequencies for the radio connection, wherein the uplink and downlink frequencies in the second configuration are in different frequency bands of the plurality of frequency bands. The method further involves changing the radio connection between the multiband mobile station and the base station to use the second configuration instead of the first configuration.

In another aspect, disclosed embodiments provide a system for wireless communication with a multiband mobile station. The multiband mobile station is configured for wireless communication in a plurality of frequency bands, the plurality of frequency bands including a first frequency band, a second frequency band, and a third frequency band. The system comprises a base station and a controller. The base station includes a first transceiver configured for wireless communication in the first frequency band, a second transceiver configured for wireless communication in the second frequency band, and a third transceiver configured for wireless communication in the third frequency band. The controller is configured to (i) determine a distance between the multiband mobile station and the base station, (ii) select a configuration of uplink and downlink frequencies for a radio connection between the base station and a multiband mobile station, such that the uplink frequency is in a frequency band that is selected from among the plurality of frequency bands based, at least in part, on the distance and the downlink frequency is in a frequency band that is selected from among the plurality of frequency bands based, at least in part, on respective downlink loads at the base station for the first, second, and third frequency bands, and (iii) control the base station to use the selected configuration for the radio connection.

DETAILED DESCRIPTION OF EXAMPLE EMBODIMENTS

1. Introduction

The inventors have recognized that the conventional approach of using the same frequency band for the uplink and downlink in a radio connection between a mobile station and base station can lead to inefficiencies due to different frequency bands having different characteristics. For example, different frequency bands can have different propagation characteristics that can result in different effective ranges. Different frequency bands may also be able to support different data rates.

To address such inefficiencies, the inventors propose methods and systems that can select one frequency band for the uplink and a different frequency band for the downlink in a radio connection between a mobile station and a base station. The selection could, for example, be made by a RAN after the radio connection has been established with an initial configuration in which the uplink and downlink are in the same frequency band.

The selection could be based, at least in part, on the mobile station's location, for example, such that the mobile station is located within the uplink range of the frequency band selected for the uplink and within the downlink range of the frequency band selected for the downlink. Alternatively or additionally, the selection could be based, at least in part, on load balancing considerations. For example, the frequency band for the uplink could be selected to balance the uplink loads between the various frequency bands supported by the base station, and the frequency band for the downlink could be selected to balance the downlink loads between the various frequency bands supported by the base station. Other factors could also be taken into account for the selection of frequency bands used in a radio connection.

Once the RAN has selected a configuration of frequency bands for the uplink and downlink in a radio connection between a mobile station and base station, the RAN may change the configuration for the radio connection in response to changing conditions. For example, if the mobile station changes its location (e.g., by moving toward or away from the base station) such that the mobile station moves out of the effective range of a particular frequency band or enters the effective range of a particular frequency band, the RAN may change the configuration used for the radio connection. The RAN could also change the configuration used for the radio connection in response to a change in the uplink or downlink load for a particular frequency band at the base station. Other events could trigger a change in the configuration of the radio connection as well.

By allowing the uplink and downlink in a radio connection to use different frequency bands, the radio resources of a base station can be used more efficiently.

2. Example Communication System

Figure 1:
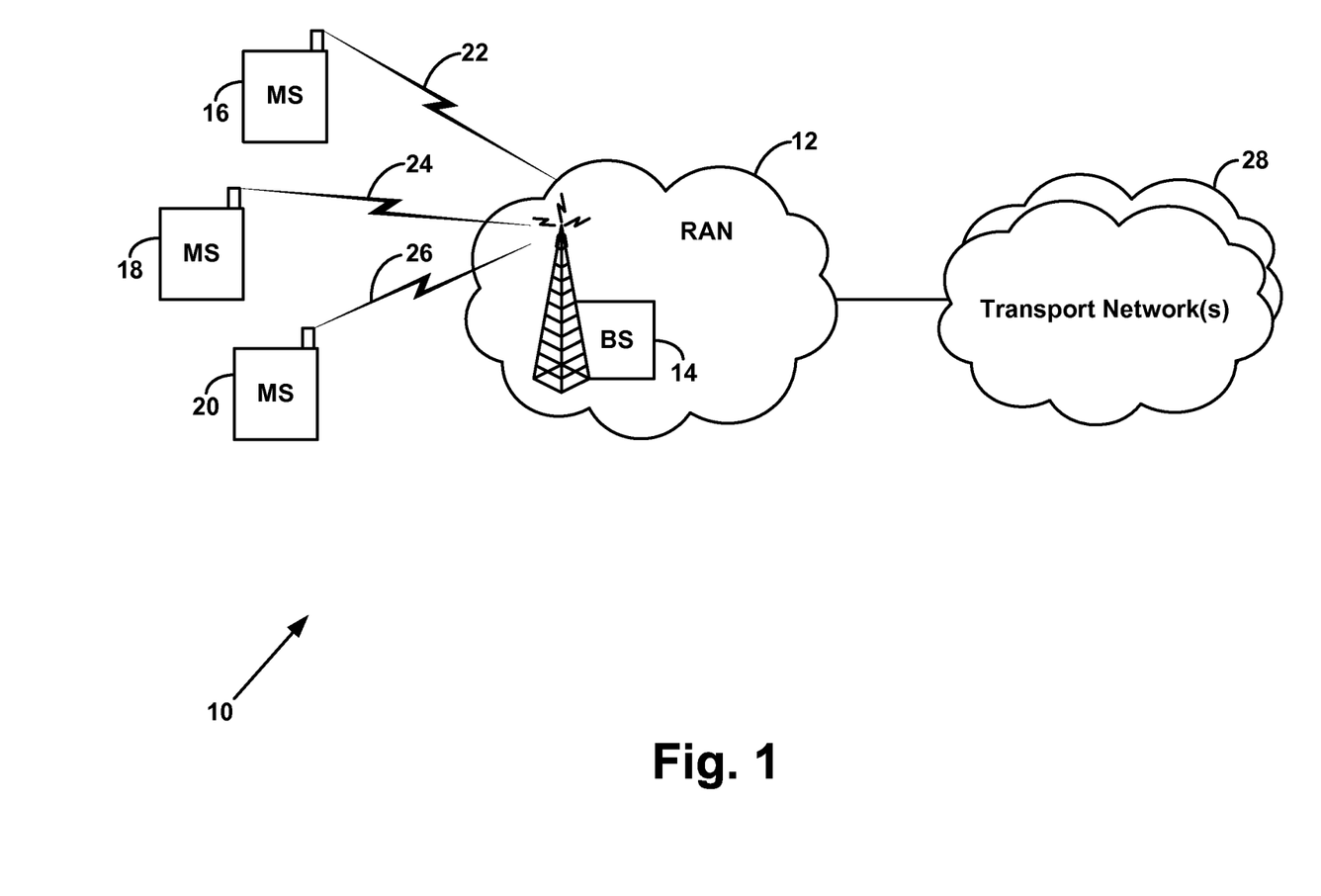
FIG. 1 is a block diagram of a communication system, in accordance with an example embodiment.

FIG. 1 is a block diagram of a communication system 10 in which exemplary embodiments may be employed. Communication system 10 includes a radio access network (RAN) 12 that includes one or more entities that can communicate over an air interface, as exemplified by base station (BS) 14. RAN 12 could also include one or more control entities, such as a base station controller (BSC) or radio network controller (RNC). BS 14 could be, for example, a base transceiver station, a wireless access point, an access node, a Node-B, or an eNodeB. Although FIG. 1 shows only one base station in RAN 12, it is to be understood that RAN 12 could include any number of base stations.

BS 14 radiates to define one or more wireless coverage areas within which BS 14 can wirelessly communicate with mobile stations (MSs). The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with mobile stations 16, 18, and 20 via respective radio connections 22, 24, and 26. Mobile stations 16, 18, and 20 could be wireless telephones, wireless handheld, tablet, or laptop computers, or other types of wireless communication devices. In some cases, a mobile station could be referred to as a UE. Although FIG. 1 shows BS 14 in wireless communication with three mobile stations, it is to be understood that BS 14 could be in wireless communication with a greater or fewer number of mobile stations. In addition, the number of mobile stations in wireless communication with BS 14 can change over time, for example, as a result of one or more mobile stations moving into or out of the wireless coverage area of BS 14 and/or as a result of one or more mobile stations beginning or ending communication sessions.

RAN 12 may provide access to one or more transport networks 28, which could include, for example, the public switched telephone network (PSTN) and/or the Internet or other packet-switched networks. With this arrangement, a mobile station being served by BS 14 may engage in a communication session, via RAN 12, with an endpoint connected to one of transport networks 28. The endpoint could be, for example, another mobile station, a landline telephone, an email server, Web server, media server, or gaming server. The communication session could involve voice, text, images, video, data, or other media that is transferred from the mobile station to the endpoint and/or from the endpoint to the mobile station.

Each of radio connections 22, 24, and 26 could include a respective uplink, with which a mobile station can transmit data to BS 14, and a respective downlink, with which BS 14 can transmit data to a mobile station. The communications over radio connections 22, 24, and 26 could conform to any wireless protocol now known or later developed. For example, the communications over radio connections 22, 24, and 26 could conform to CDMA, EVDO, GSM, UMTS, WiMAX, or LTE protocols.

The uplink and downlink of a radio connection could use different frequencies, different time slots, different codes, or could be distinguished in some other way. For example, LTE protocols can support frequency division duplexing (FDD), in which the uplink frequency is different than the downlink frequency for a given radio connection. LTE protocols can also support time division duplexing (TDD), in which the uplink frequency could be the same as the downlink frequency for a given radio connection but different time slots are used for uplink and downlink communications.

Whether FDD or TDD is used, the uplink and downlink in a given radio connection could be in the same frequency band. For example, in a frequency band that supports FDD communications, each uplink frequency in the frequency band may be paired with a respective downlink frequency in the frequency band to provide a uniform frequency spacing between uplink and downlink frequencies. As noted above, in a frequency band that supports TDD communications, the uplink and downlink in a radio connection may use the same frequency.

It also possible for the uplink and downlink frequencies of a given radio connection to be in different frequency bands. This can occur when the base station and mobile station are both configured for wireless communication in a plurality of frequency bands, i.e., the base station is a multiband base station and the mobile station is a multiband mobile station. For example, BS 14 could be configured for wireless communication in a plurality of frequency bands (e.g., three frequency bands) and MS 16 could also be configured for wireless communication in these three frequency bands. In that case, the uplink and downlink frequencies in radio connection 22 could be in any of the three frequency bands. Further, the uplink and downlink frequencies in radio connection 22 could be in the same frequency band, or the uplink and downlink frequencies in radio connection 22 could be in different frequency bands.

It is to be understood, however, that although BS 14 is configured for wireless communication in three frequency bands, BS 14 may communicate with mobile stations that are configured for wireless communication in a greater or fewer number of frequency bands. For example, MS 18 might be configured for wireless communication in only two of the three frequency bands supported by BS 14, and MS 20 might be configured for wireless communication in only one of the frequency bands.

Figure 2:
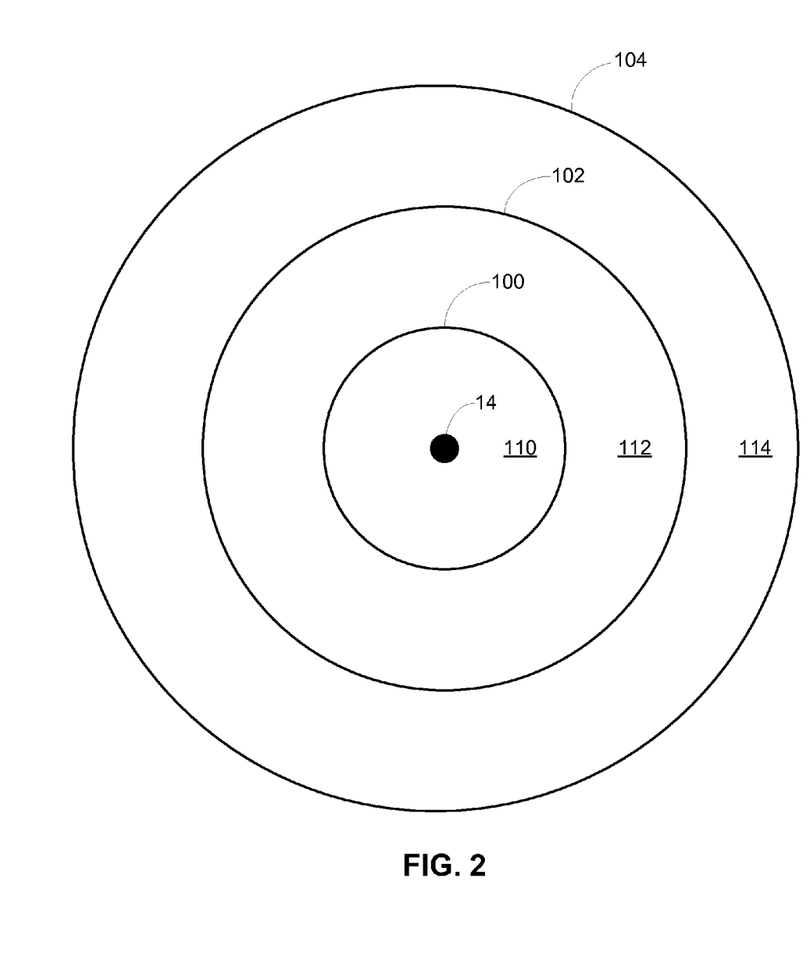
FIG. 2 is a diagram illustrating ranges for uplink communications using first, second, and third frequency bands, in accordance with an example embodiment.

The different frequency bands supported by BS 14 and MS 16 may have different characteristics, for example, in terms of range, data throughput, sensitivity to interference, etc. FIG. 2 illustrates an example in which BS 14 is configured for wireless communication in a first frequency band, a second frequency band, and a third frequency band. Each of these frequency bands may be associated with an effective range for uplink communications and an effective range for downlink communications. The effective ranges could depend on the propagation characteristics of the different frequency bands, the height of the antenna used by BS 14, the terrain around BS 14 (e.g., whether BS 14 is located in an urban or rural environment), and/or other factors. Thus, the effective ranges of the different frequency bands could be base-station specific, with base stations in rural environments generally having longer effective ranges than base stations in urban environments.

In example embodiments, the effective range on the uplink for a given frequency band could be defined as the maximum distance from the base station a mobile station can be and still transmit an uplink signal that can be received at the base station with at least a threshold signal strength and at least a threshold data rate. Similarly, in such embodiments, the effective range on the downlink for a given frequency band could be defined as the maximum distance from the base station a mobile station can be and still receive a downlink signal from the base station with at least a threshold signal strength and at least a threshold data rate. Other ways of defining the effective range for the uplink or downlink of a particular frequency band for a particular base station are possible as well.

For a given frequency band, the uplink range may be smaller than the downlink range. As such, the uplink range of a given frequency band may limit the distances from the base station within which mobile stations can communicate effectively with the base station. FIG. 2 illustrates an uplink range 100 for the first frequency band, an uplink range 102 for the second frequency band, and an uplink range 104 for the third frequency band. FIG. 2 does not illustrate the downlink ranges of these frequency bands because this example assumes that the downlink range of each of these frequency bands is greater than the uplink range 104.

Thus, when a MS is located at a distance from BS 14 that is less than uplink range 100 (region 110), the MS and BS can communicate using any of the three frequency bands for the uplink and any of the three frequency bands for the downlink. For a given radio connection between the MS and the BS, RAN 12 may select an uplink frequency from one of the three frequency bands and a downlink frequency from either the same frequency band or a different one of the three frequency bands. The RAN 12 may make this selection to provide an optimum combination of uplink and downlink characteristics based on, for example, the location of the mobile station and the base station's respective uplink and downlink loads in the three frequency bands. For example, RAN 12 may select a frequency band for the uplink so as to balance the base station's uplink load across the three frequency bands and may select a frequency band for the downlink so as to balance the base station's downlink load across the three frequency bands. The RAN 12 may also take other factors into consideration, such as the data throughput anticipated for the radio connection, user preferences, etc.

When a MS is located at a distance from BS 14 that is greater than uplink range 100 and less than uplink range 102 (region 112), the MS and BS can communicate using the second and third frequency bands for the uplink and any of the three frequency bands for the downlink. Thus, based on the MS being located in region 112, the RAN 12 may select either the second or third frequency band for the uplink (e.g., so as to balance the uplink loads in these frequency bands at BS 14) and may select any of the three frequency bands for the downlink (e.g., so as to balance the downlink loads in these frequency bands at BS 14).

When a MS is located at a distance from BS 14 that is greater than uplink range 102 and less than uplink range 104 (region 114), the MS and BS can communicate using the third frequency band for the uplink and any of the three frequency bands for the downlink. Thus, based on MS being in region 114, the RAN 12 may select the third frequency band for the uplink and any of the three frequency bands for the downlink (e.g., so as to balance the downlink loads in these frequency bands at BS 14).

In the example of FIG. 2, the first, second, and third frequency bands could, for example, be frequency bands defined by E-UTRA standards. The first frequency band could correspond to E-UTRA Band 41 (TDD 2.5 GHz), which supports uplink and downlink frequencies between 2496 and 2690 MHz. The second frequency band could correspond to E-UTRA Band 25 (PCS 1900), which supports uplink frequencies between 1850 MHz and 1915 MHz and supports downlink frequencies between 1930 MHz and 1995 MHz. The third frequency band could correspond to E-UTRA Band 26 (US 850 Extended), which supports uplink frequencies between 814 MHz and 849 MHz and supports downlink frequencies between 859 MHz and 894 MHz.

It is to be understood that the foregoing frequencies are given only as illustrative examples. A multiband base station or multiband mobile station could be configured for wireless communication in other frequency bands instead of or in addition to the foregoing. Further, the number of frequency bands supported by a multiband base station or multiband mobile station could be less than three or greater than three.

It is also to be understood that FIG. 2 illustrates uplink ranges only schematically. Thus, while FIG. 2 shows uplink ranges 100, 102, and 104 as circles centered at BS 14, the uplink range for a given frequency band could be different in different directions from the base station. Further, while FIG. 2 illustrates an example in which the downlink ranges are all greater than the uplink ranges, it is also possible for a downlink range for one of a base station's frequency bands to be less than an uplink range of another of the base station's frequency bands.

3. Example Methods

Figure 3:
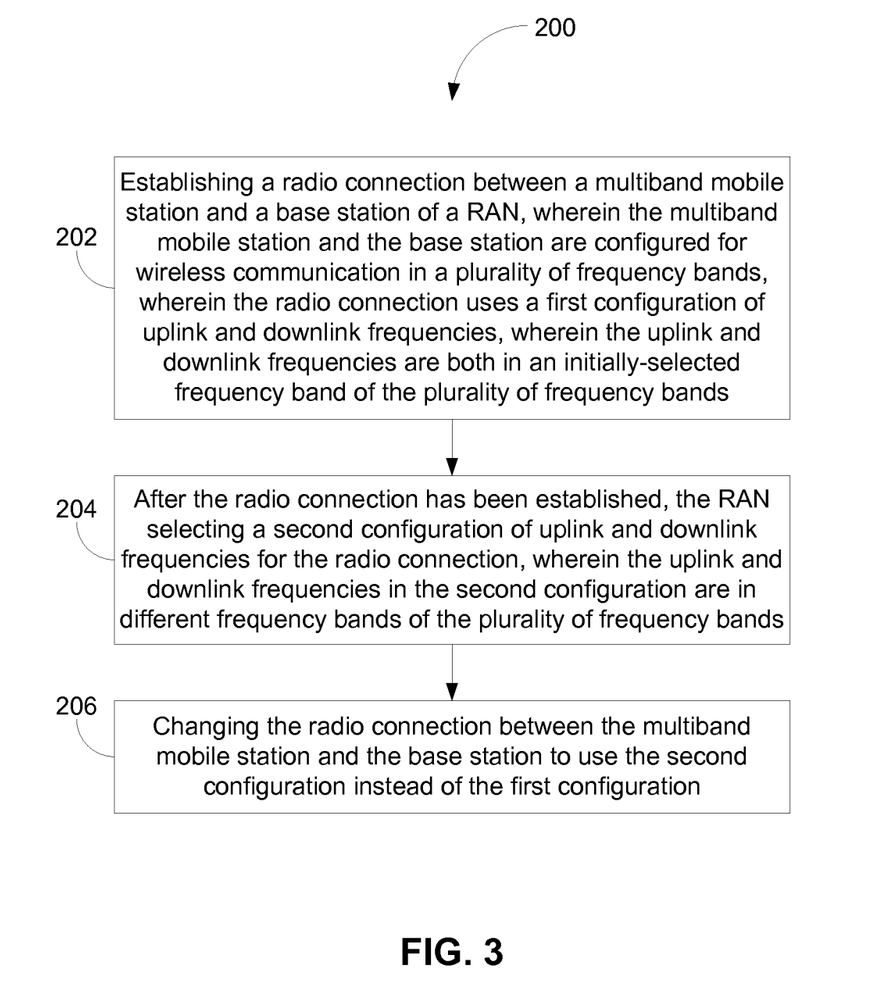
FIG. 3 is a flow chart of a method in which a first configuration of uplink and downlink frequencies and a second configuration of uplink and downlink frequencies is used for a radio connection between a multiband mobile station and a base station, in accordance with an example embodiment.

As noted above, the RAN may select uplink and downlink frequencies for a radio connection between a multiband mobile station and a multiband base station based on the distance between the multiband mobile station and the multiband base station, based on load balancing considerations, and/or based on other factors. FIG. 3 illustrates an example method 200 in which a RAN (e.g., 12) makes such a selection for radio connection between a multiband base station and a multiband mobile station (e.g., radio connection 22 between BS 14 and MS 16).

Method 200 begins with establishing a radio connection between a multiband mobile station and a base station, as indicated by block 202. The multiband mobile station and the base station are both configured for wireless communication in a plurality of frequency bands. The plurality of frequency bands could be three frequency bands (e.g., as illustrated in FIG. 2). Alternatively, the plurality of frequency bands could be a greater or fewer number of frequency bands. The radio connection that is established uses a first configuration of uplink and downlink frequencies, in which the uplink and downlink frequencies are both in the same, initially-selected frequency band of the plurality of frequency bands. The initially-selected frequency band could be selected as a result of the multiband mobile station originating or receiving a voice call, data call, or some other type of communication session.

After the radio connection has been established, the RAN selects a second configuration of uplink and downlink frequencies for the radio connection, as indicated by block 204. In some cases, the RAN may determine that the uplink and downlink frequencies in the first configuration are already optimal or acceptable. In this case, however, the RAN determines that a different frequency band should be used for the uplink and/or downlink based on the location of the multiband mobile station, the loading of the frequency bands at the base station, and/or some other factor. Thus, in the example of method 200, the second configuration is different than the first configuration and the uplink and downlink frequencies in the second configuration are in different frequency bands of the plurality of frequency bands.

As one possible example, the uplink frequency in the second configuration could be in the same frequency band as in the first configuration (i.e., in the initially-selected frequency band) and the downlink frequency in the second configuration could be in a different frequency band than in the first configuration (i.e., a subsequently-selected frequency band). As another possible example, the downlink frequency in the second configuration could be in the same frequency band as in the first configuration (i.e., in the initially-selected frequency band) and the uplink frequency in the second configuration could be in a different frequency band than in the first configuration (i.e., a subsequently-selected frequency band). As yet another possible example, the uplink and downlink frequencies in the second frequency band could both be in different frequency bands than in the first configuration (i.e., the uplink frequency could be in a first subsequently-selected frequency band and the downlink frequency could be in a second, different subsequently-selected frequency band).

The RAN may select the second configuration automatically once the radio connection has been established using the first configuration. Alternatively, the RAN may select the second configuration in response to some other type of trigger event, such as the multiband mobile station changing its location, a change in the uplink or downlink load at the base station, or some other trigger.

Method 200 further involves changing the radio connection between the multiband mobile station and the base station to use the second configuration instead of the first configuration, as indicated by block 206. The change may be brought about, at least in part, by the RAN instructing the multiband mobile station to use a new uplink frequency and/or a new downlink frequency for the radio connection. Thus, the RAN may instruct the multiband mobile station to change its uplink frequency to a frequency in a subsequently-selected frequency band and/or to change its downlink frequency to a frequency in a subsequently-selected frequency band.

Figure 4:
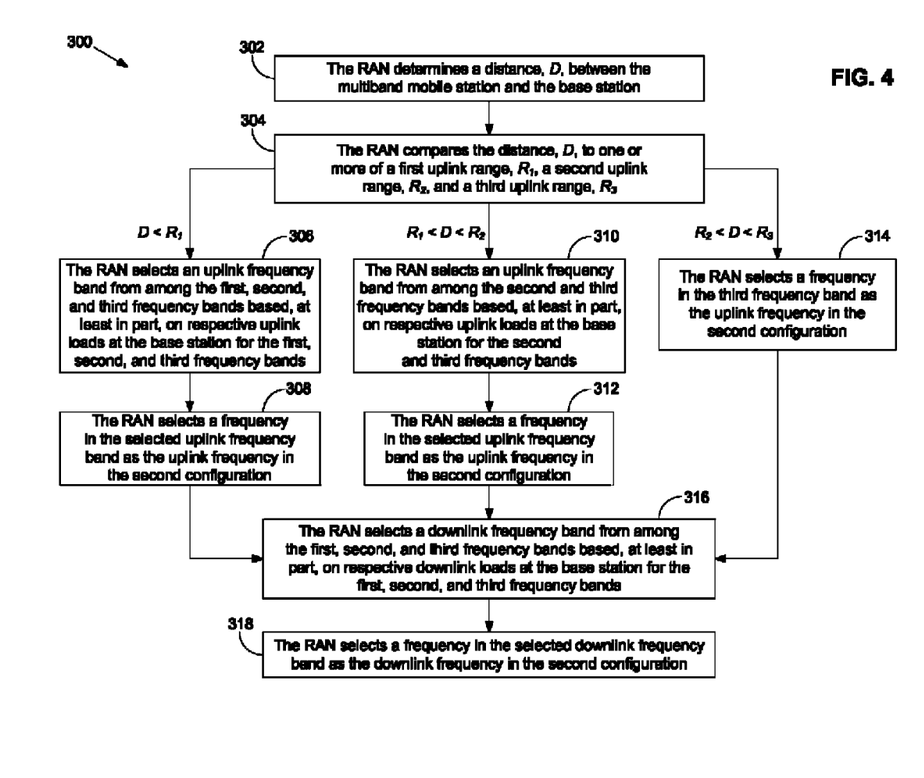
FIG. 4 is a flow chart of a method for selecting an uplink frequency and a downlink frequency for the second configuration of FIG. 3.

FIG. 4 illustrates an example method 300 by which the RAN may select the uplink and downlink frequencies of the second configuration. In this example, the RAN determines a distance, D, between the multiband mobile station and the base station, as indicated by block 302. In some examples, the RAN may determine the distance based on round-trip delay measurements. In other examples, the distance may be an actual distance or an equivalent distance that is determined based on a signal strength measurement of a base station signal at the mobile station, a data throughput that the mobile station is experiencing, and/or some other metric that is indicative of the radio frequency conditions at the mobile station.

The RAN then compares the distance, D, to one or more of a first uplink range, $R_1$, a second uplink range, $R_2$, and a third uplink range, $R_3$, as indicated by block 304. The first uplink range is associated with a first frequency band. The second uplink range is associated with a second frequency band. The third uplink range is associated with a third frequency band. The uplink ranges may be specific for that base station (e.g., the uplink ranges may have been determined based on the antenna height of the base station, the terrain surrounding the base station, and/or other factors). In this example, the second uplink range is greater than the first uplink range, and the third uplink range is greater than the second uplink range. Thus, with reference to FIG. 2, first uplink range, $R_1$, could correspond to uplink range 100, second uplink range, $R_2$, could correspond to uplink range 102, and third uplink range, $R_3$, could correspond to uplink range 104.

If D is less than $R_1$, then the RAN selects an uplink frequency band from among the first, second, and third frequency bands based, at least in part, on respective uplink loads at the base station for the first, second, and third frequency bands, as indicated by block 306. Once the uplink frequency band has been selected, the RAN selects a frequency in the selected uplink frequency band as the uplink frequency in the second configuration, as indicated by block 308.

If D is greater than $R_1$ but less than $R_2$, then the RAN selects an uplink frequency band from among the second and third frequency bands based, at least in part, on respective uplink loads at the base station for the second and third frequency bands, as indicated by block 310. Once the uplink frequency band has been selected, the RAN selects a frequency in the selected uplink frequency band as the uplink frequency in the second configuration, as indicated by block 312.

If D is greater than $R_2$ but less than $R_3$, then the RAN selects a frequency in the third frequency band as the uplink frequency in the second configuration, as indicated by block 314.

While the RAN may select the uplink frequency band based, at least in part, on the distance between the multiband mobile station and the base station, the RAN may select the downlink frequency band based on other considerations. For example, the RAN may select a downlink frequency band from among the first, second, and third frequency bands based, at least in part, on respective loads at the base station for the first, second, and third frequency bands, as indicated by block 316. Once the downlink frequency band has been selected, the RAN may select a frequency in the selected downlink frequency band as the downlink frequency in the second configuration, as indicated by block 318.

4. Example Base Station

Figure 5:
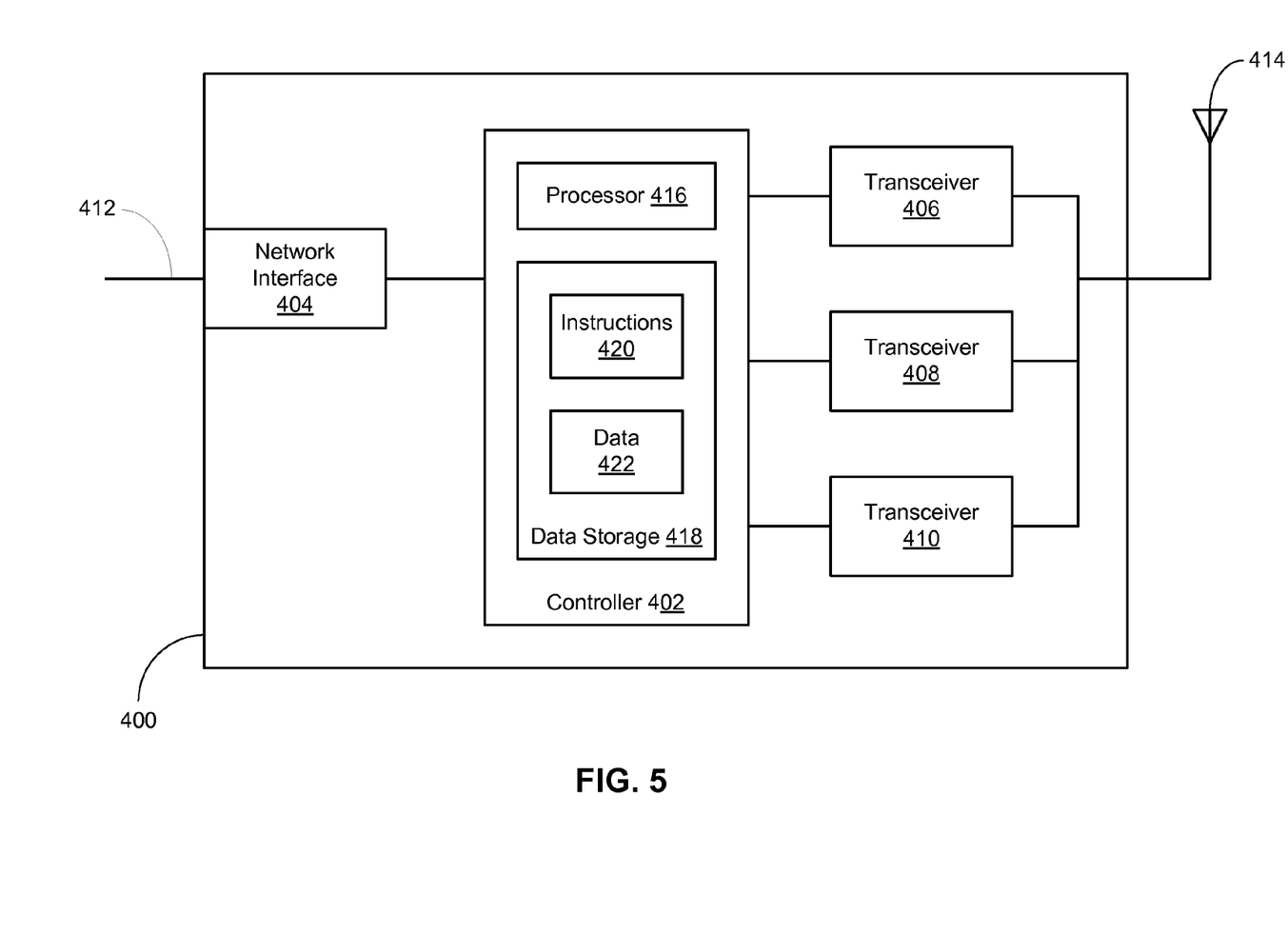
FIG. 5 is a block diagram of a base station, in accordance with an example embodiment.

FIG. 5 illustrates an example base station 400 that can perform at least some of the functions described herein, such as functions relating to method 200 shown in FIG. 3 and functions relating to method 300 shown in FIG. 4. Base station 400 could, for example, correspond to base station 14 shown in FIGS. 1 and 2.

As shown in FIG. 5, base station 400 includes a controller 402 that is coupled to a network interface 404, a first transceiver 406, a second transceiver 408, and a third transceiver 410. Network interface 404 is configured to communicate with one or more entities in the RAN via a backhaul connection 412. Transceivers 406, 408, and 410 are configured for wireless communication with mobile stations that are operating in the wireless coverage area of base station 400, via one or more antennas, as exemplified in FIG. 5 by antenna 414. More particularly, transceiver 406 is configured to transmit and receive wireless signals in a first frequency band, transceiver 408 is configured to transmit and receive wireless signals in a second frequency band, and transceiver 410 is configured to transmit and receive wireless signals in a third frequency band.

Controller 402 could be configured to control the functioning of base station 400. Thus, in relation to controlling the uplink and downlink frequencies used in a radio connection between a multiband mobile station and the base station, controller 402 could be configured to: (i) determine a distance between the multiband mobile station and the base station, (ii) select a configuration of uplink and downlink frequencies for the radio connection such that the uplink frequency is in a frequency band that is selected from among a plurality of frequency bands based, at least in part, on the distance, and the downlink frequency is in a frequency band that is selected from among the plurality of frequency bands based, at least in part, on respective downlink loads at the base station for the first, second, and third frequency bands, and (iii) control the base station to use the selected configuration for the radio connection.

In some examples, the uplink and downlink frequencies in the selected configuration could be in different frequency bands. In some examples, controller 402 may select the configuration in response to the radio connection being established with an initial configuration of uplink and downlink frequencies. In some examples, controller 402 may select the configuration in response to the multiband mobile station changing its location (e.g., moving toward base station 400 or away from base station 400). In some examples, controller 402 may select the configuration in response to a change in the uplink or downlink load of one of the transceivers 406-410. Controller 402 could select the configuration for the radio connection in response to other triggers as well.

Controller 402 could be implemented using hardware, software, and/or firmware. In an example embodiment, controller 402 includes a processor 416 and data storage 418. Data storage 418 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 418 may store instructions 420 and data 422. Instructions 420 could be executable instructions that, when executed by processor 416, cause base station 400 to perform functions, such as any of the functions described herein. Data 422 may include any type of data that may be generated or used by controller 402. For example, data 422 may include distances between base station 400 and various mobile stations being served by base station 400, effective uplink and downlink ranges of the frequency bands used by transceivers 406-410 (the ranges may be specific to base station 400), the uplink and downlink loads of each of transceivers 406-410, and/or any other information that may be used to select a configuration for a radio connection.

Although FIG. 5 shows controller 402 as part of base station 400, it is to be understood that controller 402 could alternatively be a separate network element. For example, controller 402 could be a base station controller, radio network controller, mobility management entity, or some other network entity that is configured to control base station 400. It is also possible that the functions described above for controller 402 could be distributed among multiple network elements, for example, with some functions being performed by a controller in base station 400 and some functions being performed by one or more network elements separate from base station 400.

5. Conclusion

Example embodiments have been described above. Those skilled in the art will understand, however, that changes and modifications may be made to these embodiments without departing from the true scope and spirit of the invention, which is defined by the claims.

What is claimed is:

1. A method, comprising:
   establishing a radio connection between a multiband mobile station and a base station of a radio access network (RAN), wherein the multiband mobile station and the base station are configured for wireless communication in a plurality of frequency bands, wherein the plurality of frequency bands includes a first frequency band, a second frequency band, and a third frequency band, wherein the radio connection uses a first configuration of uplink and downlink frequencies, and wherein the uplink and downlink frequencies in the first configuration are both in an initially-selected frequency band of the plurality of frequency bands;
   after the radio connection has been established, the RAN selecting a second configuration of uplink and downlink frequencies for the radio connection, wherein the uplink and downlink frequencies in the second configuration are in different frequency bands of the plurality of frequency bands, wherein the RAN selecting a second configuration of uplink and downlink frequencies for the multiband mobile station comprises (i) the RAN determining a distance between the multiband mobile station and the base station and (ii) the RAN selecting the uplink frequency in the second configuration based, at least in part, on the distance; and
   changing the radio connection between the multiband mobile station and the base station to use the second configuration instead of the first configuration.

2. The method of claim 1, wherein the uplink frequency in the second configuration is in the initially-selected frequency band of the plurality of frequency bands and the downlink frequency in the second configuration is in a subsequently-selected frequency band of the plurality of frequency bands, and wherein the subsequently-selected frequency band is different than the initially-selected frequency band.

3. The method of claim 2, wherein changing the radio connection between the multiband mobile station and the base station to use the second configuration instead of the first configuration comprises the RAN instructing the multiband mobile station to change its downlink frequency to a frequency in the subsequently-selected frequency band.

4. The method of claim 1, wherein the uplink frequency in the second configuration is in a subsequently-selected frequency band of the plurality of frequency bands and the downlink frequency in the second configuration is in the initially-selected frequency band of the plurality of frequency bands, and wherein the subsequently-selected frequency band is different than the initially-selected frequency band.

5. The method of claim 4, wherein changing the radio connection between the multiband mobile station and the base station to use the second configuration instead of the first configuration comprises the RAN instructing the multiband mobile station to change its uplink frequency to a frequency in the subsequently-selected frequency band.

6. The method of claim 1, wherein the uplink frequency in the second configuration is in a first subsequently-selected frequency band of the plurality of frequency bands and the downlink frequency in the second configuration is in a second subsequently-selected frequency band of the plurality of frequency bands, wherein the first and second subsequently-selected frequency bands are different than the initially-selected frequency band, and wherein the first subsequently-selected frequency band is different than the second subsequently-selected frequency band.

7. The method of claim 6, wherein changing the radio connection between the multiband mobile station and the base station to use the second configuration instead of the first configuration comprises the RAN instructing the multiband mobile station to change its uplink frequency to a frequency in the first subsequently-selected frequency band and to change its downlink frequency to a frequency in the second subsequently-selected frequency band.

8. The method of claim 1, wherein the first frequency band supports uplink and downlink frequencies between 2496 MHz and 2690 MHz, wherein the second frequency band supports uplink frequencies between 1850 MHz and 1915 MHz and supports downlink frequencies between 1930 MHz and 1995 MHz, and wherein the third frequency band supports uplink frequencies between 814 MHz and 849 MHz and supports downlink frequencies between 859 MHz and 894 MHz.

9. The method of claim 1, wherein the RAN selecting the uplink frequency in the second configuration based, at least in part, on the distance comprises:
the RAN comparing the distance to one or more of a first uplink range, a second uplink range, and a third uplink range, wherein the first uplink range is associated with the first frequency band, wherein the second uplink range is associated with the second frequency band, wherein the third uplink range is associated with the third frequency band, and wherein the second uplink range is greater than the first uplink range and the third uplink range is greater than the second uplink range.

10. The method of claim 9, wherein the RAN selecting the uplink frequency in the second configuration based, at least in part, on the distance further comprises:
the RAN determining that the distance is greater than the second uplink range and less than the third uplink range; and
the RAN selecting a frequency in the third frequency band as the uplink frequency in the second configuration.

11. The method of claim 9, wherein the RAN selecting the uplink frequency in the second configuration based, at least in part, on the distance further comprises:
the RAN determining that the distance is greater than the first uplink range and less than the second uplink range;
the RAN selecting a frequency band from among the second and third frequency bands based, at least in part, on respective uplink loads at the base station for the second and third frequency bands; and
the RAN selecting a frequency in the selected frequency band as the uplink frequency in the second configuration.

12. The method of claim 9, wherein the RAN selecting the uplink frequency in the second configuration based, at least in part, on the distance further comprises:
the RAN determining that the distance is less than the first uplink range;
the RAN selecting a frequency band from among the first, second, and third frequency bands based, at least in part, on respective uplink loads at the base station for the first, second, and third frequency bands; and
the RAN selecting a frequency in the selected frequency band as the uplink frequency in the second configuration.

13. The method of claim 1, wherein the RAN selecting a second configuration of uplink and downlink frequencies for the multiband mobile station further comprises:
the RAN selecting a frequency band from among the first, second, and third frequency bands based, at least in part, on respective downlink loads at the base station for the first, second, and third frequency bands; and
the RAN selecting a frequency in the selected frequency band as the downlink frequency in the second configuration.

14. A system for wireless communication with a multiband mobile station, wherein the multiband mobile station is configured for wireless communication in a plurality of frequency bands, the plurality of frequency bands including a first frequency band, a second frequency band, and a third frequency band, the system comprising:
a base station, wherein the base station includes a first transceiver configured for wireless communication in the first frequency band, a second transceiver configured for wireless communication in the second frequency band, and a third transceiver configured for wireless communication in the third frequency band; and
a controller, wherein the controller is configured to (i) determine a distance between the multiband mobile station and the base station, (ii) select a configuration of uplink and downlink frequencies for a radio connection between the base station and a multiband mobile station, such that the uplink frequency is in a frequency band that is selected from among the plurality of frequency bands based, at least in part, on the distance and the downlink frequency is in a frequency band that is selected from among the plurality of frequency bands based, at least in part, on respective downlink loads at the base station for the first, second, and third frequency bands, wherein the uplink and downlink frequencies in the selected configuration are in different frequency bands, and (iii) control the base station to use the selected configuration for the radio connection.

15. The system of claim 14, wherein the controller is configured to select the uplink frequency in the selected configuration based, at least in part, on a comparison of the distance to one or more of a first uplink range, a second uplink range, and a third uplink range, wherein the first uplink range is associated with the first frequency band, wherein the second uplink range is associated with the second frequency band, wherein the third uplink range is associated with the third frequency band, and wherein the second uplink range is greater than the first uplink range and the third uplink range is greater than the second uplink range.

16. The system of claim 14, wherein the controller is configured to select the configuration in response to establishment of the radio connection between the base station and the multiband mobile station using an initial configuration of uplink and downlink frequencies.

17. The system of claim 14, wherein the controller is configured to select the configuration in response to the multiband mobile station moving toward or away from the base station.

* * * * *